(12) United States Patent
Ogaki et al.

(10) Patent No.: US 6,572,918 B2
(45) Date of Patent: Jun. 3, 2003

(54) COATING SOLUTION FOR FORMING COLORED FILM ON GLASS SUBSTRATE, GLASS PLATE WITH SUCH COLORED FILM, AND PROCESS FOR PRODUCING SUCH GLASS PLATE

(75) Inventors: Katsuhiko Ogaki, Mie (JP); Masato Tao, Mie (JP); Nobuyuki Itakura, Mie (JP); Yukihiro Ogitani, Mie (JP)

(73) Assignee: Central Glass Company, Limited, Ube (JP)

( * ) Notice: Subject to any disclaimer, the term of this patent is extended or adjusted under 35 U.S.C. 154(b) by 282 days.

(21) Appl. No.: 09/781,962

(22) Filed: Feb. 14, 2001

(65) Prior Publication Data

US 2002/0007767 A1 Jan. 24, 2002

(30) Foreign Application Priority Data

Feb. 16, 2000 (JP) ......................................... 2000-037659
Feb. 29, 2000 (JP) ......................................... 2000-054094

(51) Int. Cl.[7] ........................... C03C 17/30; G02B 1/10; B05D 3/02; B32B 17/06
(52) U.S. Cl. ..................... 427/163.1; 427/165; 427/168; 427/384; 427/387; 427/397.7; 428/428; 428/429; 106/287.11; 106/287.16
(58) Field of Search ................... 106/287.11, 287.16; 427/163.1, 165, 168, 384, 387, 397.7; 428/428, 429

(56) References Cited

U.S. PATENT DOCUMENTS 5,433,941 A * 7/1995 Patel ............................ 424/50
6,358,612 B1 * 3/2002 Bier et al. ................. 428/429

* cited by examiner

Primary Examiner—David Brunsman
(74) Attorney, Agent, or Firm—Crowell & Moring LLP

(57) ABSTRACT

A first coating solution for forming a colored film on a glass substrate contains a titanium alkoxide; a silicon alkoxide; a coloring agent that is a nitrogen-containing organic compound; and an organic solvent dissolving the titanium alkoxide, the silicon alkoxide and the nitrogen-containing organic compound. A second coating solution therefor contains a titanium alkoxide; a silicon alkoxide; and an organic solvent dissolving the titanium alkoxide and the silicon alkoxide. At least one of these titanium alkoxide and silicon alkoxide of the second coating solution contains in the molecule a nitrogen-containing organic group derived from a nitrogen-containing organic compound.

28 Claims, 1 Drawing Sheet

COATING SOLUTION FOR FORMING COLORED FILM ON GLASS SUBSTRATE, GLASS PLATE WITH SUCH COLORED FILM, AND PROCESS FOR PRODUCING SUCH GLASS PLATE

BACKGROUND OF THE INVENTION

This invention relates to a coating solution for forming a colored film on a glass substrate, a glass plate (particularly automotive window glass) with such colored film, and a process for producing such glass plate.

In recent years, colored glass plates (of green, gray and other colors) have been widely used for vehicular window panes (particularly automotive side and rear windows) in order to reduce a load on air-conditioner and to suppress glare and discoloration of interior trim members. With this, it becomes possible to adequately suppress the transmission of solar radiation (i.e., infrared light, visible light and ultraviolet light) and thereby to maintain a comfortable interior environment. Furthermore, when a colored glass plate is used for an automotive window pane, it becomes possible to reduce interior visibility from outside and thereby improve privacy and to provide an ornamental effect on an automobile.

In the production of a colored glass plate by coloring a glass substrate itself, it may be necessary to add a coloring source (i.e., metal and/or metal compound) to a float glass bath when other raw materials are added thereto. This addition of coloring source is a relatively large-scale operation. Furthermore, it takes time to conduct pretreatment and post-treatment in order to replace the production of a colored glass with that of other types of glass and vice versa. Thus, the production cost of such colored glass plate is relatively high.

It is possible to easily produce a colored glass plate by forming a colored film on a transparent glass substrate with a relatively short time and a relatively low cost. It is possible to form such colored film by applying a coating solution to a surface of a glass substrate. In sol-gel process, the coating solution can be prepared by dissolving a metal alkoxide(s) and a coloring source (e.g., a metal nitrate, chloride or oxide) in a suitable solvent (e.g., alcohol). Alternatively, the coating solution can be prepared by a pigment dispersion method in which an inorganic pigment (e.g., metal oxide) or organic pigment is dispersed in a liquid. This pigment dispersion method makes the operation complicated and increases the production cost. Furthermore, a colored film prepared by using an inorganic pigment may be inferior in scratch resistance. Therefore, it may be necessary to coat such colored film with a protective film.

In sol-gel process, the coating solution is applied to a glass substrate, and then the resulting precursory film is heated into a colored film through dehydration and condensation. The resulting colored film is superior in scratch resistance. However, metal nitrate used as a coloring source in sol-gel process may generate a hazardous nitrogen oxide. The use of a noble metal or noble metal compound as a coloring source increases the production cost. The use of chromium oxide as a coloring source may induce an environmental pollution problem.

As mentioned above, it is possible to produce a colored glass plate by sol-gel process using an inorganic pigment or metal oxide as a coloring source. Even if this colored glass plate is heated at a temperature not lower than its softening point, it is impossible or difficult to completely remove color of this glass plate. Due to the existence of color, it is impossible or troublesome to recycle this glass plate in the form of cullet by putting it into a float glass bath.

SUMMARY OF THE INVENTION

It is therefore an object of the present invention to provide a coating solution which is free of the above-mentioned drawbacks.

It is another object of the present invention to provide a glass plate prepared by using such coating solution.

It is still another object of the present invention to provide a process for producing such glass plate.

It is a specific object of the present invention to provide such glass plate which is decolorized when heated at a temperature not lower than its softening point.

According to a first aspect of the present invention, there is provided a first coating solution for forming a colored film on a glass substrate. The first coating solution comprises (a) a titanium alkoxide; (b) a silicon alkoxide; (c) a coloring agent that is a nitrogen-containing organic compound; and (d) an organic solvent dissolving said titanium alkoxide, said silicon alkoxide and said nitrogen-containing organic compound.

According to the first aspect of the present invention, there is provided a first colored glass plate comprising (a) a glass substrate; and (b) a colored film formed on said glass substrate. This colored film is prepared by a process comprising applying the first coating solution to a surface of said glass substrate.

According to the first aspect of the present invention, there is provided a first process for producing the first colored glass plate. The first process comprises (a) applying the first coating solution a surface of said glass substrate, thereby forming thereon a precursory film; and (b) heating said precursory film at a temperature of 200–800° C. into said colored film.

According to a second aspect of the present invention, there is provided a second coating solution for forming a colored film on a glass substrate. The second coating solution comprises (a) a titanium alkoxide; (b) a silicon alkoxide; (c) a nitrogen-containing organic group contained in a molecule of at least one of said titanium alkoxide and said silicon alkoxide, said nitrogen-containing organic group being derived from a nitrogen-containing organic compound; and (d) an organic solvent dissolving said titanium alkoxide and said silicon alkoxide.

According to the second aspect of the present invention, there is provided a second colored glass plate comprising (a) a glass substrate; and (b) a colored film formed on said glass substrate. This colored film is prepared by a process comprising applying the second coating solution to a surface of said glass substrate.

According to the second aspect of the present invention, there is provided a second process for producing the second colored glass plate. The second process comprises (a) applying the second coating solution to a surface of said glass substrate, thereby forming thereon a precursory film; and (b) heating said precursory film at a temperature of 200–800° C. into said colored film.

BRIEF DESCRIPTION OF THE DRAWINGS

FIGURE is a graph showing a result of Auger electron spectroscopy of a colored film obtained in Example 1-1.

DESCRIPTION OF THE PREFERRED EMBODIMENTS

Figure 1:
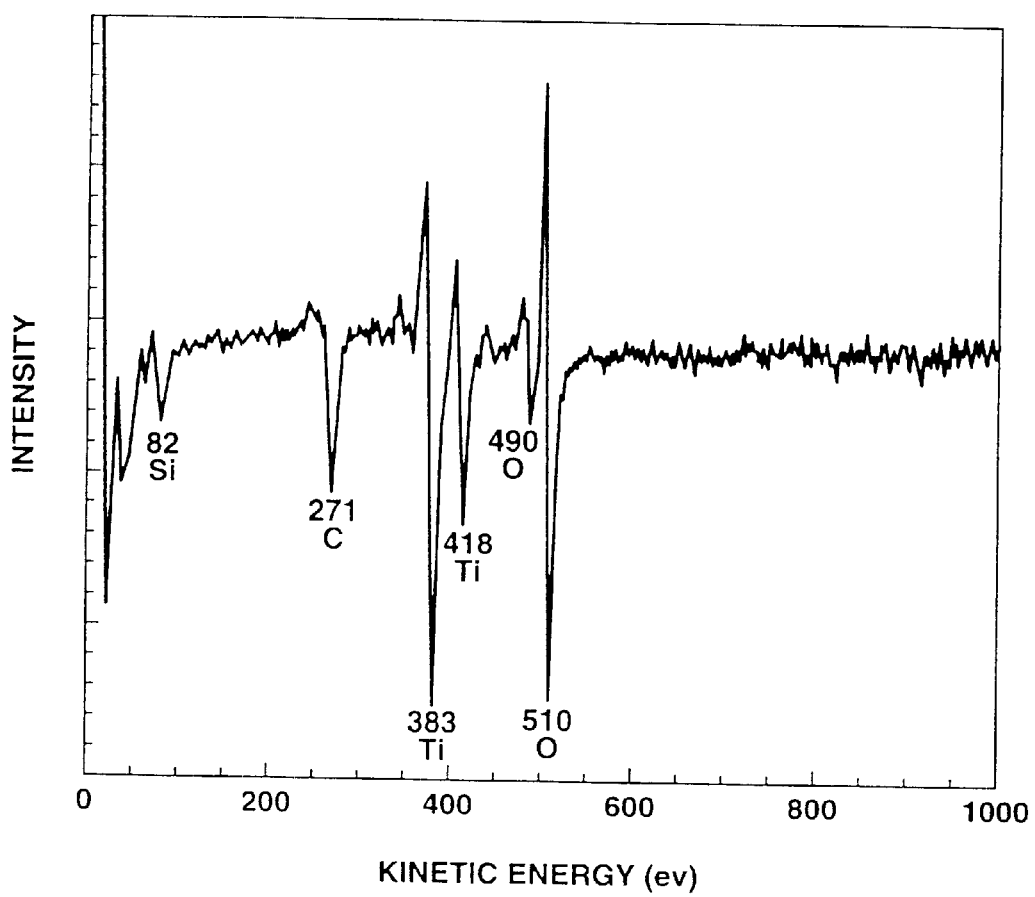

Each of the first and second coating solutions is free of the above-mentioned drawbacks. In other words, these coating solutions are each free of an undesirable coloring source (e.g., hazardous metal nitrates, noble metals and noble metal compounds, and hazardous chromium oxides). Therefore, the resulting first and second glass plates are also free of such undesirable coloring source.

It is possible to form a colored film, which is compact and hard and has a brown color, by applying the first or second coating solution to a surface of a glass substrate in a wet manner and then by heating the resulting precursory film. Furthermore, it is possible to remove color (e.g., brown color) of the colored film of the first or second glass plate by heating the glass plate at a temperature not lower than its softening point. Therefore, it is possible to recycle these glass plates by putting them into a float glass bath.

As stated above, at least one alkoxide of titanium alkoxide and silicon alkoxide of the second coating solution contains in the molecule a nitrogen-containing organic group derived from a nitrogen-containing organic compound. Therefore, this at least one alkoxide has a relatively large molecular weight and is superior in stability in an organic solvent, as compared with a metal alkoxide having a smaller molecular weight. Thus, the second coating solution containing such at least one alkoxide is also improved in stability and prolonged in pot life, since it is possible to suppress the precipitation of solid matter in the second coating solution and gelation of the second coating solution.

In the second coating solution, the coloring source, that is, a nitrogen-containing organic group, is contained in the molecule of at least one alkoxide of titanium alkoxide and silicon alkoxide. Therefore, as this at least one alkoxide is dispersed throughout the second coating solution, the nitrogen-containing organic group is also uniformly dispersed. With this, it becomes possible to form a colored film having a uniform color in the entire area of the colored film.

In addition to titanium alkoxide and silicon alkoxide, each of the first and second coating solutions may further contain at least one alkoxide of at least one metal selected from Al, Zr, Ta, and Ce. With this, it becomes possible to adjust the ultraviolet transmittance, refractive index, and/or the like, thereby providing the colored film with desirable film characteristics.

Examples of the silicon alkoxide contained in the first coating solution are tetraethoxysilane, methyltriethoxysilane, tetra-n-butoxysilane, tetramethoxysilane, tetrapropoxysilane, methyltrimethoxysilane, ethyltrimethoxysilane, and ethyltriethoxysilane. Examples of the titanium alkoxide contained in the first coating solution are titanium tetraethoxide, titanium tetrabutoxide, titanium isopropoxide, and titanium methoxide. Examples of the above-mentioned at least one alkoxide may be similar to those of the silicon alkoxide, such as those (tetraalkoxides and alkyltrialkoxides) of the at least one metal selected from Al, Zr, Ta, and Ce.

In case that the silicon alkoxide of the second coating solution does not contain in its molecule the above-mentioned nitrogen-containing organic group, examples of such silicon alkoxide can be the same as those of the silicon alkoxide of the first coating solution. The same is true with the case of the titanium alkoxide of the second coating solution. In contrast, when the silicon alkoxide of the second coating solution contains in its molecule the nitrogen-containing organic group, examples of such silicon alkoxide are N-(2-aminoethyl)-3-aminopropyltrimethoxysilane, methacrylamidepropyltriethoxysilane, N-(3-methacryloxy-2-hydroxypropyl)-3-aminopropyltriethoxysilane, (3-triethoxysilylpropyl)-t-butylcarbamate, N-(triethoxysilylpropyl)dansylamide, N-(triethoxysilylpropyl)-4-hydroxybutylamide, N-(triethoxysilylpropyl) gluconamide, N-triethoxysilylpropyl-O-menthocarbamate, 3-(triethoxysilylpropyl)-P-nitrobenzamide, and bis[3-(trimethoxysilyl)propyl] ethylenediamine. Furthermore, when the titanium alkoxide of the second coating solution contains in its molecule the nitrogen-containing organic group, examples of such titanium alkoxide are N-(triethoxytitaniumpropyl)-4-hydroxybutylamide and titanium bis(triethanolamine) diisopropoxide.

The ratio of the molar concentration of titanium of the titanium alkoxide in the first or second coating solution to the molar concentration of the total of silicon of said silicon alkoxide and said at least one metal in said first or second coating solution is preferably from 0.4:1 to 20:1. With this, it is possible to obtain a colored film having a brown color by heating the precursory film. If the ratio is outside of this range, it may be difficult to form a colored film by heating the precursory film. Similarly, when the at least one alkoxide of the at least one metal is not contained in the first or second coating solution, the ratio of the molar concentration of the titanium in the first or second coating solution to that of the silicon in the first or second coating solution is also preferably from 0.4:1 to 20:1.

Examples of the nitrogen-containing organic compound are amines, amine salts, amides, nitriles, isocyanates, hydrazines, azo compounds, azides, nitroso compounds, nitro compounds, imides, urea and mixture of at least two of these. More concrete examples are ethylenediamine, triethanolamine, hydrazine, and triethylenediamine.

If the total concentration of all the metal alkoxides (i.e., titanium alkoxide and silicon alkoxide (silicon is defined as a metal in this specification for simplification) and optionally the at least one alkoxide) in the first or second coating solution is too low, it may be difficult to form a colored film. If the total concentration is too high, the metal alkoxides of the first or second coating solution may become unstable. Thus, a solid matter may be precipitated in the first or second coating solution as time passes. Furthermore, the first or second coating solution itself may turn into a gel. The above total concentration is preferably 0.01–1.5 moles per kilogram of the first or second coating solution. With this, it becomes possible to maintain all the metal alkoxides of the first or second coating solution in a stable condition.

The nitrogen-containing organic compound can be in an amount of 0.01–10 moles per kilogram of the first coating solution. Similarly, at least one alkoxide of titanium alkoxide and silicon alkoxide, which contains in the molecule the nitrogen-containing organic group, can be in an amount of 0.01 moles or greater per kilogram of the second coating solution. If it is less than 0.01 moles per kilogram of the first or second coating solution, it may be difficult to obtain a colored film. Even if it is adjusted to be greater than 10 moles per kilogram of the first coating solution, the colored film may not have a deeper color.

It is optional to add another coloring source, that is, a nitrogen-containing organic compound itself, preferably in an amount of 10 moles or less per kilogram of the second coating solution, to the second coating solution, in addition to the above at least one alkoxide. Examples of this nitrogen-containing organic compound may be the same as those of that contained in the first coating solution. Even if it is adjusted to be greater than 10 moles per kilogram of the second coating solution, the colored film may not have a deeper color.

Titanium alkoxide is a very unstable compound and therefore tends to turn into a gel. Thus, it is preferable to add a chelating agent (e.g., acetylacetone) to the first or second coating solution in order to prevent titanium alkoxide from turning into a gel. With this, a titanium complex (i.e., a chelate compound) is formed, and this complex is stable and is not easily hydrolyzed at room temperature. Therefore, it is possible to prevent the above-mentioned gelation of titanium alkoxide.

It is preferable to add a catalyst to the first or second coating solution in order to accelerate hydrolysis of the metal alkoxides of the coating solution. Examples of this catalyst are acids (e.g., nitric acid) and bases (e.g., ammonia). The addition of this catalyst is, however, not essential in the preparation of the first or second coating solution. Furthermore, it is optional to add a small amount of water to the first or second coating solution in order to hydrolyze the metal alkoxides. This water, however, is not essential, since the hydrolysis can proceed by moisture in the air when the precursory film is formed on a glass substrate.

The organic solvent of the first or second coating solution is not particularly limited, so long as it is capable of dissolving the metal alkoxides (including titanium alkoxide and silicon alkoxide) and the nitrogen-containing organic compound (in case of the first coating solution) and capable of maintaining these compounds (solutes) in a stable condition. Examples of this organic solvent are lower alcohols (e.g., methanol, ethanol, n-propanol, and isopropanol), diols (e.g., ethylene glycol and propylene glycol), cellosolves (e.g., ethylene glycol monomethyl ether and propylene glycol monomethyl ether), cellosolve acetates, and mixtures of at least two of these.

The reason why the colored film of the first glass plate has a color (e.g., a brown color) is assumed, as follows. Even after heating of the precursory film into a colored film in which titanium alkoxide and silicon alkoxide have turned into their oxides, the nitrogen-containing organic compound may still be present in the form of chelate or nitrate in the colored film. Under this condition where the nitrogen-containing organic compound is blocked from contact with oxygen, carbon derived from the nitrogen-containing organic compound may serve as a coloring source of the first glass plate. Similarly, carbon derived from the nitrogen-containing organic group may serve as a coloring source of the second glass plate. Since carbon is assumed to be a coloring source of the first and second glass plates, the color of the first and second glass plates disappears by melting these glasses. Therefore, these glasses can be put into a float glass bath for recycling.

According to the first and second processes, the precursory film is heated at a temperature of 200–800° C., preferably 400–800° C. With this, it is possible to obtain a colored film which is compact and hard and has a brown color. Even after heating of the precursory film at a temperature of 400° C. or higher into a colored film, carbon can remain in the colored film to serve as a coloring source. The upper limit of the temperature of the heating may be the maximum heat-resisting temperature of the glass substrate. It is about 800° C. if the glass substrate is made of a conventional soda-lime glass. If the heating temperature is 400° C. or higher, it is possible to obtain a colored film having a brown color of an adequate depth. If the heating temperature is in a range of 200–400° C., the colored film may become too thin in color. In fact, it is possible to adjust the light transmittance (color depth) of the colored film by suitably selecting (a) the type and the concentration of the nitrogen-containing organic compound of the first coating solution or those of the above-mentioned at least one of titanium alkoxide and silicon alkoxide of the second coating solution, (b) the thickness of the colored film, (c) the heating temperature, and (d) and heating time.

The manner of applying the first or second coating solution is not particularly limited, so long as a precursory film of a predetermined thickness is formed on a glass substrate. It may be flow coating, spraying, roller coating, spin coating, dip coating, screen printing or flexography.

As described above, it is assumed that carbon remaining in the colored film serves as a coloring source. Therefore, the colored film does not easily have cracks even if its thickness is increased, as compared with a colored film in which a conventional pigment or metal oxide is dispersed as a coloring source. In fact, according to the invention, it is possible to form a crack-free colored film, even if its thickness is increased to about 500 nm in case of applying the first or second coating solution for once by flexography or the like. Furthermore, it is also possible to form a crack-free colored film, even if its thickness is increased to about 1,400 nm in case of applying the first or second coating solution for several times by flexography or the like.

The colored film obtained by the first or second process is superior in scratch resistance, too. It is possible to substantially lower the transmittance of the visible light and the ultraviolet light by the first and second glass plates of the invention. Therefore, these glass plates are capable of suppressing deterioration of articles of automobile or building interior due to ultraviolet light, in addition to improving privacy. The color of the first and second glass plates is sufficiently maintained, even if they are heated at about their softening point. Therefore, it is possible to subject the first and second glass plates to bending under a heated condition or tempering through heating and subsequent rapid cooling, without loosing the color of these glass plates. Furthermore, it is optional to conduct bending and/or tempering at the same time when a colored film is formed.

The type of the glass substrate is not particularly limited, and it can be selected from various glasses (e.g., soda-lime glass, aluminosilicate glass and borosilicate glass). The glass substrate may be colored or colorless, so long as it is transparent. It is, however, preferable to use a transparent colorless plate glass in order to make the first and second glass plates have a desired color (e.g., a brown color).

The following nonlimitative Examples 1-1 to 1-8 are illustrative of the first aspect of the present invention.

EXAMPLE 1-1

At first, titanium (IV) isopropoxide and tetraethoxysilane were weighed in a manner to adjust the molar ratio of titanium to silicon of these compounds to 1, and then dissolved in ethanol. Then, acetylacetone in an amount equimolar with the titanium isopropoxide was added to the resulting solution. Then, ethylenediamine (i.e., a nitrogen-containing organic compound) in an amount (by number of moles) that is half of the total number of moles of titanium and silicon of the solution was added, thereby preparing a coating solution.

Separately, a washed glass substrate was masked at its one surface with a masking sheet. Then, this glass substrate was dipped in the coating solution and then withdrawn at a rate of 5 mm/s in an atmosphere having a humidity of 45% and a room temperature of 22° C., thereby forming a precursory film on the unmasked surface of the glass substrate. After that, the masking sheet was removed from the glass substrate. Then, the coated glass substrate was heated at 350° C.

for 5 minutes to dry the precursory film and then at 650° C. for 3 minutes to harden the precursory film into a colored film of a brown color, thereby producing a colored glass plate with the colored film.

The obtained colored film was subjected to Auger electron spectroscopy, and its results are shown in FIGURE where the abscissa and ordinate represent electron kinetic energy and detected intensity of Auger electrons, respectively. It was found by this Auger electron spectroscopy that the colored film contains carbon, even though the precursory film was subjected to the above heating at 650° C. for 3 minutes. This carbon is assumed to be a coloring source of brown color of the colored film. As shown in FIGURE, signals of 82 eV, 383 eV and 418 eV, 490 eV and 510 eV, and 271 eV respectively represent Si, Ti, O (oxygen) and C (carbon).

The visible light transmittance of the obtained colored glass plate was determined within a wavelength range of 340–1,800 nm with a 340-type automated spectrophotometer of Hitachi Ltd. in accordance with Japanese Industrial Standard (JIS) Z 8722 and JIS R 3106 or JIS Z 8701. The thickness of the colored film was determined by contact scanning a previously formed stepped portion with a probe of a surface configuration tester, DEKTAK 3030 (trade name) of Sloan Co. The haze value of the colored glass was measured with a haze meter, NDH-20D (trade name) of Nihon Denshoku Kogyousha Co., in accordance with JIS K 6714. The results are shown in Table. Furthermore, the radio transmittance of the colored glass plate was determined by measuring its surface resistance with MEGARESTER MODEL H0709 (trade name) of a Shishido Electrostatic LTD. With this, the radio transmittance was found to be sufficient. Furthermore, the colored film did not have cracks and was found to be sufficient in scratch resistance, stain resistance, and chemical resistance.

TABLE

| | Ti/Si by mol | N-cont. Org. Comp. | Molar Ratio of (Ti + Si) to N-cont. Org. Comp. | Colored Film Thickness (nm) | Visible Light Transmittance (%) | Haze Value (%) |
|---|---|---|---|---|---|---|
| Ex. 1-1 | 1.0 | Ethylenediamine | 2.0 | 300 | 8.1 | 0.2 |
| Ex. 1-2 | 3.0 | Ethylenediamine | 2.0 | 250 | 21.3 | 0.2 |
| Ex. 1-3 | 0.45 | Ethylenediamine | 2.0 | 310 | 15.7 | 0.1 |
| Ex. 1-4 | 1.8 | Triethanolamine | 1.3 | 300 | 4.2 | 0.3 |
| Ex. 1-5 | 4.0 | Triethanolamine | 1.0 | 250 | 23.5 | 0.1 |
| Ex. 1-6 | 8.0 | Hydrazine | 0.5 | 150 | 29.3 | 0.1 |
| Ex. 1-7 | 0.8 | Triethylenediamine | 0.5 | 180 | 33.0 | 0.1 |
| Ex. 1-8 | 15.0 | Triethylenediamine | 0.5 | 260 | 18.1 | 0.1 |
| Com. Ex. 1-1 | 0.35 | Ethylenediamine | 2.0 | 300 | 90.0 | 0.1 |

EXAMPLE 1-2

Example 1-1 was repeated except in that titanium (IV) isopropoxide and tetraethoxysilane were weighed in a manner to adjust the molar ratio of titanium to silicon of these compounds to 3:1, thereby obtaining a colored glass plate with a colored film of a brown color. The radio transmittance was found to be sufficient. Furthermore, the colored film did not have cracks and was found to be sufficient in scratch resistance, stain resistance, and chemical resistance.

EXAMPLE 1-3

Example 1-1 was repeated except in that titanium (IV) isopropoxide and tetraethoxysilane were weighed in a manner to adjust the molar ratio of titanium to silicon of these compounds to 0.45:1, thereby obtaining a colored glass plate with a colored film of a brown color. The radio transmittance was found to be sufficient. Furthermore, the colored film did not have cracks and was found to be sufficient in scratch resistance, stain resistance, and chemical resistance.

EXAMPLE 1-4

At first, titanium (IV) isopropoxide and tetraethoxysilane were weighed in a manner to adjust the molar ratio of titanium to silicon of these compounds to 1.8:1, and then dissolved in ethanol. Then, acetylacetone in an amount equimolar with the titanium isopropoxide was added to the resulting solution. Then, triethanolamine (i.e., a nitrogen-containing organic compound) in an amount (by number of moles) such that the molar ratio of the total number of moles of titanium and silicon of the solution to triethanolamine becomes 1.3 was added, followed by addition of nitric acid (as a catalyst) and then stirring, thereby preparing a coating solution. Then, the same procedures as those of Example 1-1 were conducted, thereby producing a colored glass plate with a colored film of a brown color.

Then, the same tests as those of Example 1-1 were conducted, and their results are shown in Table. The radio transmittance was found to be sufficient. Furthermore, the colored film did not have cracks and was found to be sufficient in scratch resistance, stain resistance, and chemical resistance.

EXAMPLE 1-5

At first, titanium (IV) isopropoxide and tetraethoxysilane were weighed in a manner to adjust the molar ratio of titanium to silicon of these compounds to 4:1, and then dissolved in ethanol. Then, acetylacetone in an amount equimolar with the titanium isopropoxide was added to the resulting solution. Then, triethanolamine (i.e., a nitrogen-containing organic compound) in an amount (by number of moles) such that the molar ratio of the total number of moles of titanium and silicon of the solution to triethanolamine becomes 1.0 was added, followed by addition of nitric acid (as a catalyst) and then stirring, thereby preparing a coating solution. Then, the same procedures as those of Example 1-1 were conducted, thereby producing a colored glass plate with a colored film of a brown color.

Then, the same tests as those of Example 1-1 were conducted, and their results are shown in Table. The radio transmittance was found to be sufficient. Furthermore, the colored film did not have cracks and was found to be sufficient in scratch resistance, stain resistance, and chemical resistance.

EXAMPLE 1-6

At first, titanium (IV) isopropoxide and tetraethoxysilane were weighed in a manner to adjust the molar ratio of titanium to silicon of these compounds to 8:1, and then dissolved in ethanol. Then, acetylacetone in an amount equimolar with the titanium isopropoxide was added to the resulting solution. Then, hydrazine (i.e., a nitrogen-containing organic compound) in an amount (by number of moles) such that the molar ratio of the total number of moles of titanium and silicon of the solution to hydrazine becomes 0.5 was added, followed by addition of nitric acid (as a catalyst) and then stirring, thereby preparing a coating solution. Then, the same procedures as those of Example 1-1 were conducted, thereby producing a colored glass plate with a colored film of a brown color.

Then, the same tests as those of Example 1-1 were conducted, and their results are shown in Table. The radio transmittance was found to be sufficient. Furthermore, the colored film did not have cracks and was found to be sufficient in scratch resistance, stain resistance, and chemical resistance.

EXAMPLE 1-7

At first, titanium (IV) isopropoxide and tetraethoxysilane were weighed in a manner to adjust the molar ratio of titanium to silicon of these compounds to 0.8:1, and then dissolved in ethanol. Then, acetylacetone in an amount equimolar with the titanium isopropoxide was added to the resulting solution. Then, triethylenediamine (i.e., a nitrogen-containing organic compound) in an amount (by number of moles) such that the molar ratio of the total number of moles of titanium and silicon of the solution to triethylenediamine becomes 0.5 was added, thereby preparing a coating solution. Then, the same procedures as those of Example 1-1 were conducted, thereby producing a colored glass plate with a colored film of a brown color.

Then, the same tests as those of Example 1-1 were conducted, and their results are shown in Table. The radio transmittance was found to be sufficient. Furthermore, the colored film did not have cracks and was found to be sufficient in scratch resistance, stain resistance, and chemical resistance.

EXAMPLE 1-8

Example 1-7 was repeated except that titanium (IV) isopropoxide and tetraethoxysilane were weighed in a manner to adjust the molar ratio of titanium to silicon of these compounds to 15:1, thereby obtaining a colored glass plate with a colored film of a brown color. The radio transmittance was found to be sufficient. Furthermore, the colored film did not have cracks and was found to be sufficient in scratch resistance, stain resistance, and chemical resistance.

COMPARATIVE EXAMPLE 1-1

Example 1-1 was repeated except that titanium (IV) isopropoxide and tetraethoxysilane were weighed in a manner to adjust the molar ratio of titanium to silicon of these compounds to 0.35, thereby obtaining a glass plate with a film that is colorless and transparent. The same tests as those of Example 1-1 were conducted, and their results are shown in Table.

COMPARATIVE EXAMPLE 1-2

Example 1-1 was repeated except that the addition of ethylenediamine was omitted, thereby obtaining a glass plate with a film that is colorless and transparent. The visible light transmittance of this glass plate was found by the same measurement as that of Example 1-1 to be 90.0%.

The brown color of each colored glass plate obtained in Examples 1-1 to 1-7 disappeared by heating each colored glass plate at a temperature that is its softening point or higher.

The following nonlimitative Examples 2-1 to 2-3 are illustrative of the second aspect of the present invention.

EXAMPLE 2-1

At first, titanium (IV) isopropoxide and N-(2-aminoethyl)-3-aminopropyltrimethoxysilane were weighed in a manner to adjust the molar ratio of titanium to silicon of these compounds to 2:1, and then dissolved in ethanol. Then, acetylacetone in an amount equimolar with the titanium isopropoxide was added to the resulting solution, followed by addition of nitric acid (as a catalyst) and then stirring, thereby preparing a coating solution. Then, the same procedures as those of Example 1-1 were conducted, except that the heating temperature of 650° C. was replaced with 750° C., thereby producing a colored glass plate with a colored film of a brown color.

The same tests as those of Example 1-1 were conducted. As a result of these tests, it was found that the colored film thickness was 330 nm, the visible light transmittance was 13.5%, the haze value was 0.2%, and the radio transmittance was sufficient. Furthermore, the colored film did not have cracks and was found to be sufficient in scratch resistance, stain resistance, and chemical resistance.

EXAMPLE 2-2

Example 2-1 was repeated except that titanium (IV) isopropoxide and N-(2-aminoethyl)-3-aminopropyltrimethoxysilane were weighed in a manner to adjust the molar ratio of titanium to silicon of these compounds to 10:1, thereby producing a colored glass plate with a colored film of a brown color.

It was found by the same measurements as those of Example 1-1 that the colored film thickness was 300 nm, the visible light transmittance was 10.3%, and the radio transmittance was sufficient. Furthermore, the colored film did not have cracks and was found to be sufficient in scratch resistance, stain resistance, and chemical resistance.

EXAMPLE 2-3

Example 2-1 was repeated except that diethanolamine in an amount equimolar with the titanium (IV) isopropoxide was additionally dissolved in the ethanol, thereby producing a colored glass plate with a colored film of a brown color.

It was found by the same measurements as those of Example 1-1 that the colored film thickness was 300 nm, the visible light transmittance was 9.3%, and the radio transmittance was sufficient. Furthermore, the colored film did not have cracks and was found to be sufficient in scratch resistance, stain resistance, and chemical resistance.

COMPARATIVE EXAMPLE 2-1

Example 2-1 was repeated except that N-(2-aminoethyl)-3-aminopropyltrimethoxysilane was replaced with tetraethoxysilane, thereby obtaining a glass plate with a film that is colorless and transparent. The visible light transmittance of this glass plate was found by the same measurement as that of Example 1-1 to be 91.0%.

The entire disclosure of each of Japanese Patent Application Nos. 2000-037659 filed on Feb. 16, 2000 and 2000-054094 filed on Feb. 29, 2000, including specification, drawings, claims and summary, is incorporated herein by reference in its entirety.

What is claimed is:

1. A coating solution for forming a colored film on a glass substrate, said coating solution comprising:

a titanium alkoxide;

a silicon alkoxide;

a coloring agent that is a nitrogen-containing organic compound; and an organic solvent dissolving said titanium alkoxide, said silicon alkoxide and said nitrogen-containing organic compound.

2. A coating solution according to claim 1, wherein said coating solution further comprises at least one alkoxide of at least one metal selected from the group consisting of Al, Zr, Ta, and Ce.

3. A coating solution according to claim 2, wherein a ratio of a molar concentration of titanium of said titanium alkoxide in said coating solution to a molar concentration of a total of silicon of said silicon alkoxide and said at least one metal in said coating solution is 0.4:1 to 20:1.

4. A coating solution according to claim 2, wherein a total of said titanium alkoxide, said silicon alkoxide, and said at least one alkoxide is 0.01–1.5 moles per kilogram of said coating solution.

5. A coating solution according to claim 1, wherein said nitrogen-containing organic compound is at least one selected from the group consisting of amines, amine salts, amides, nitriles, isocyanates, hydrazines, azo compounds, azides, nitroso compounds, nitro compounds, imides and urea.

6. A coating solution according to claim 1, a total of said titanium alkoxide and said silicon alkoxide is 0.01–1.5 moles per kilogram of said coating solution.

7. A coating solution according to claim 1, wherein said nitrogen-containing organic compound is in an amount of 0.01–10 moles per kilogram of said coating solution.

8. A coating solution according to claim 1, wherein said coating solution further comprises a chelating agent.

9. A coating solution according to claim 8, wherein said chelating agent is acetylacetone.

10. A coating solution according to claim 1, wherein said coating solution further comprises a catalyst for accelerating hydrolysis of said titanium alkoxide and said silicon alkoxide.

11. A colored glass plate comprising:

a glass substrate; and a colored film formed on said glass substrate, said colored film being prepared by a process comprising applying a coating solution according to claim 1 to a surface of said glass substrate.

12. A process for producing a colored glass plate comprising a glass substrate and a colored film formed on said glass substrate, said process comprising:

applying a coating solution according to claim 1 to a surface of said glass substrate, thereby forming thereon a precursory film; and heating said precursory film at a temperature of 200–800° C. into said colored film.

13. A process according to claim 12, wherein said temperature is from 400 to 800° C.

14. A coating solution for forming a colored film on a glass substrate, said coating solution comprising:

a titanium alkoxide;

a silicon alkoxide;

a nitrogen-containing organic group contained in a molecule of at least one of said titanium alkoxide and said silicon alkoxide, said nitrogen-containing organic group being derived from a nitrogen-containing organic compound; and an organic solvent dissolving said titanium alkoxide and said silicon alkoxide.

15. A coating solution according to claim 14, wherein said coating solution further comprises at least one alkoxide of at least one metal selected from the group consisting of Al, Zr, Ta, and Ce.

16. A coating solution according to claim 15, wherein a ratio of a molar concentration of titanium of said titanium alkoxide in said coating solution to a molar concentration of a total of silicon of said silicon alkoxide and said at least one metal in said coating solution is 0.4:1 to 20:1.

17. A coating solution according to claim 15, wherein a total of said titanium alkoxide, said silicon alkoxide, and said at least one alkoxide is 0.01–1.5 moles per kilogram of said coating solution.

18. A coating solution according to claim 14, wherein said nitrogen-containing organic compound is at least one selected from the group consisting of amines, amine salts, amides, nitriles, isocyanates, hydrazines, azo compounds, azides, nitroso compounds, nitro compounds, imides and urea.

19. A coating solution according to claim 14, a total of said titanium alkoxide and said silicon alkoxide is 0.01–1.5 moles per kilogram of said coating solution.

20. A coating solution according to claim 14, wherein said at least one of said titanium alkoxide and said silicon alkoxide, which contains in the molecule said nitrogen-containing organic group, is in an amount of 0.01–10 moles per kilogram of said coating solution.

21. A coating solution according to claim 14, wherein said coating solution further comprises a nitrogen-containing organic compound.

22. A coating solution according to claim 21, wherein said nitrogen-containing organic compound is in an amount of 10 moles or less per kilogram of said coating solution.

23. A coating solution according to claim 14, wherein said coating solution further comprises a chelating agent.

24. A coating solution according to claim 23, wherein said chelating agent is acetylacetone.

25. A coating solution according to claim 14, wherein said coating solution further comprises a catalyst for accelerating hydrolysis of said titanium alkoxide and said silicon alkoxide.

26. A colored glass plate comprising:

a glass substrate; and a colored film formed on said glass substrate, said colored film being prepared by a process comprising applying a coating solution according to claim 14 to a surface of said glass substrate.

27. A process for producing a colored glass plate comprising a glass substrate and a colored film formed on said glass substrate, said process comprising:

applying a coating solution according to claim 14 to a surface of said glass substrate, thereby forming thereon a precursory film; and heating said precursory film at a temperature of 200–800° C. into said colored film.

28. A process according to claim 27, wherein said temperature is from 400 to 800° C.

* * * * *